(12) United States Patent
Mohns (10) Patent No.: US 8,505,671 B1
(45) Date of Patent: Aug. 13, 2013

(54) DRIVABLE CASTER WHEEL

(76) Inventor: Brad Mohns, Jackson, MN (US)

( * ) Notice: Subject to any disclaimer, the term of this patent is extended or adjusted under 35 U.S.C. 154(b) by 87 days.

(21) Appl. No.: 13/251,687

(22) Filed: Oct. 3, 2011

(51) Int. Cl.
*B60K 7/00* (2006.01)
*B60K 17/00* (2006.01)

(52) U.S. Cl.
USPC .......................................... 180/308; 180/305

(58) Field of Classification Search
USPC .......... 180/54.1, 297, 305, 307, 308; 60/487, 60/490, 491, 497
See application file for complete search history.

(56) References Cited

U.S. PATENT DOCUMENTS 6,591,971 B1 *  7/2003  Sheahan ...................... 198/518

* cited by examiner

*Primary Examiner* — John Walters
*Assistant Examiner* — James Triggs
(74) *Attorney, Agent, or Firm* — Jeffrey A. Proehl; Woods, Fuller, Shultz & Smith, P.C.

(57) ABSTRACT

A drivable caster wheel assembly comprises a support socket defining a journal, a support frame with a post with a portion thereof positioned in the journal and being rotatable in the journal of the support socket about a substantially vertical axis. The support frame may include an arm mounted on the post. An axle is mounted on the arm. A wheel is mounted on the axle and is rotatable about a substantially horizontal axis. A hydraulic motor is mounted on the support frame and configured to rotate the wheel with respect to the support frame. A fluid transfer structure is configured to transfer fluid from a fluid power source on the mobile base when the support socket is mounted on the mobile base to the motor for driving the wheel while maintaining an ability of the support frame and wheel to rotate about the substantially vertical axis.

14 Claims, 5 Drawing Sheets

DRIVABLE CASTER WHEEL

BACKGROUND

Field

The present disclosure relates to caster wheels and more particularly pertains to a new drivable caster wheel to provide a vehicle with the enhanced maneuverability of a caster wheel while also providing the enhanced traction provided by driving all or substantially all of the wheels of the vehicle.

SUMMARY

The present disclosure describes a new drivable caster wheel apparatus and system for utilizing the drivable caster wheel which may be utilized for driving all or most of the wheels of a utility vehicle.

In one aspect, the present disclosure relates to a drivable caster wheel assembly that may comprise a support socket for mounting on a mobile base, with the socket defining a journal. A support frame may be mounted on the support socket, and comprise a post with at least a portion thereof positioned in the journal and being rotatable in the journal of the support socket about a substantially vertical axis. The post has an outer surface. The support frame may include at least one arm mounted on the post and extending downwardly from the post. An axle may be mounted on the at least one arm of the support frame, and a wheel may be mounted on the axle and being rotatable with respect to the support frame about a substantially horizontal axis. A hydraulic motor may be mounted on the support frame and configured to rotate the wheel with respect to the support frame. A fluid transfer structure may be configured to transfer fluid from a fluid power source on the mobile base when the support socket is mounted on the mobile base to the motor for driving the wheel while maintaining an ability of the support frame and wheel to rotate with respect to the support socket about the substantially vertical axis.

In another aspect, the disclosure relates to a system that may comprise a mobile base including a main frame and at least one wheel mounted on the main frame, a fluid power source on the mobile base, and a drivable caster wheel assembly. The assembly may comprise a support socket mounted on the main frame of the mobile base. The socket defines a journal. A support frame has a post with at least a portion thereof positioned in the journal and being rotatable in the journal about a substantially vertical axis, and at least one arm mounted on the post and extending downwardly from the post. An axle is mounted on the at least one arm of the support frame. A wheel is mounted on the axle and being rotatable with respect to the support frame about a substantially horizontal axis. A hydraulic motor is mounted on the support frame and configured to rotate the wheel with respect to the support frame. A fluid transfer structure may be configured to transfer fluid from the fluid power source on the mobile base when the support socket is mounted on the mobile base to the motor for driving the wheel while maintaining an ability of the support frame and wheel to rotate with respect to the support socket about the substantially vertical axis.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 5 thereof, a new drivable caster wheel 10 embodying the principles and concepts of the disclosed subject matter will be described.

The applicant has recognized that while it is generally desirable to drive all of the wheels of utility vehicles that do not operate solely on paved and/or level surfaces, The applicant is not aware of a drive system that permits the driving of wheels that are mounted on the vehicle in a castered manner, e.g., a manner that permits unfettered rotation of the wheel about a substantially vertical axis as well as rotation about the normal substantially horizontal axis, and thus "all wheel drive" or "four wheel drive" has not been available on vehicles that employ such caster wheels. Since the use of caster wheels may allow the vehicle to operate with a "zero turn radius", it would therefore be beneficial to devise a caster wheels that is driven to rotate just as the non-caster wheels of the vehicle are driven to rotate. Applicant has developed such a drivable caster wheel apparatus and system utilizing the driven caster wheel.

Figure 1:
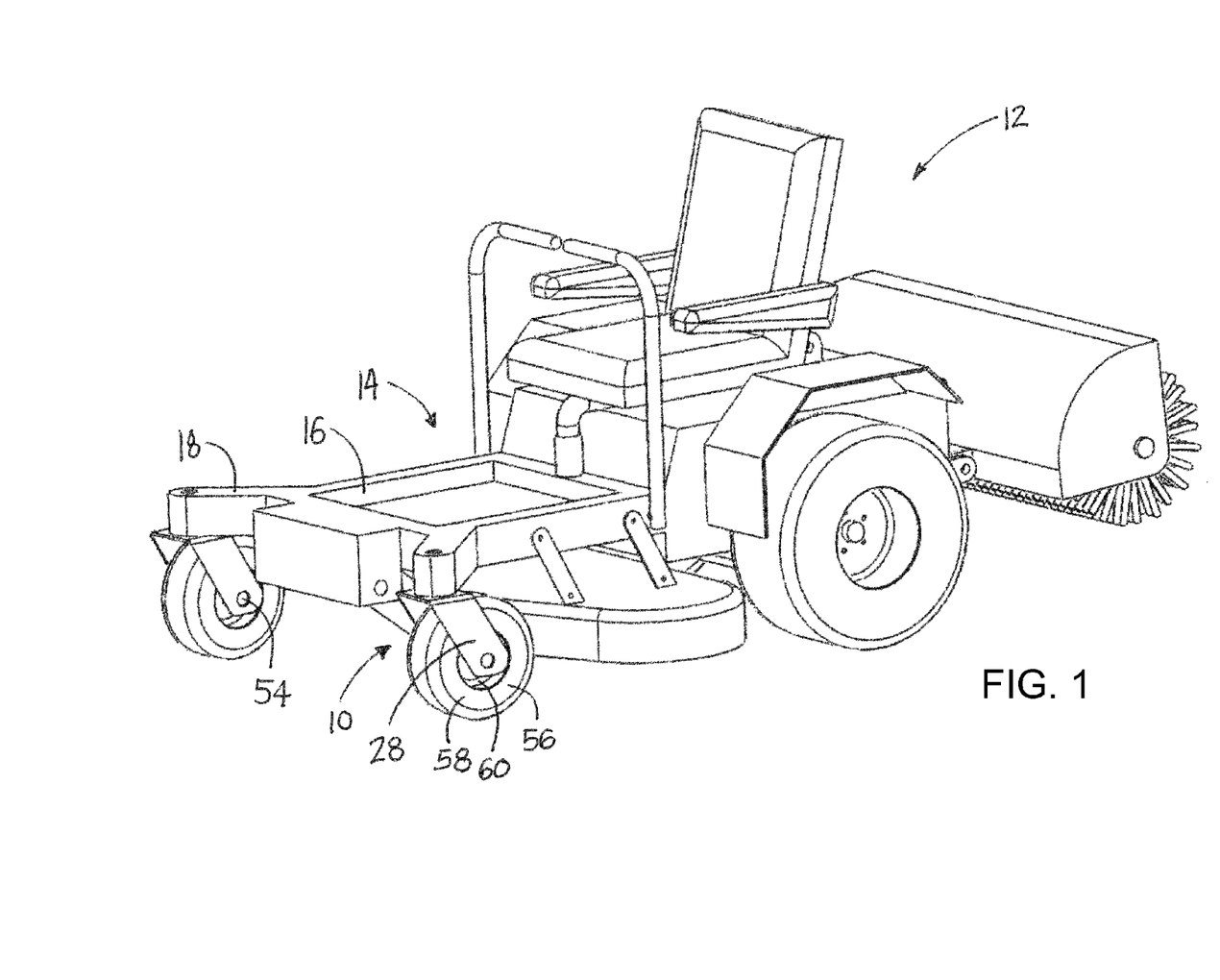
FIG. 1 is a schematic perspective view of a mobile base comprising a lawn tractor implementing a new drivable caster wheel according to the present disclosure.

In one aspect of the disclosure, a system 12 will be described on which the drivable caster wheel assembly 10 may be integrated, although it will be recognized that the usefulness and suitability of the wheel 10 extends beyond the system described. The illustrative system 12 is embodied on a lawn tractor or utility vehicle such as is shown in FIG. 1. The system 12 may include a mobile base 14 which comprises the utility vehicle. In turn, the mobile base 14 may include a main frame 16 which may have one or more wheels mounted thereon that are distinct from the drivable caster wheel. The mobile base may also include other elements suitable for the particular apparatus, such as a seat and suitable controls when the mobile base is a tractor. The other various elements of the mobile base will not be described in further detail as the elements are not critical to the invention.

In some embodiments of the mobile base 14, a frame extension 18 may extend from the main frame. Illustratively, the frame extension 18 extends forwardly from the main frame, and suitably a pair of the frame extensions is mounted on the main frame and may extend forwardly and outwardly from and with respect to the main frame. Each frame extension 18 may have an inboard end 20 mounted on the main frame 16 and an outboard end 22. The mobile base 14 may also include a support socket 24 which may be positioned toward the front of the mobile base. The support socket 24 defines a journal 26 oriented along a substantially vertical axis. The support socket 24 may be mounted on the frame extension 18 at the outboard end thereof, although this is not critical.

Figure 5:
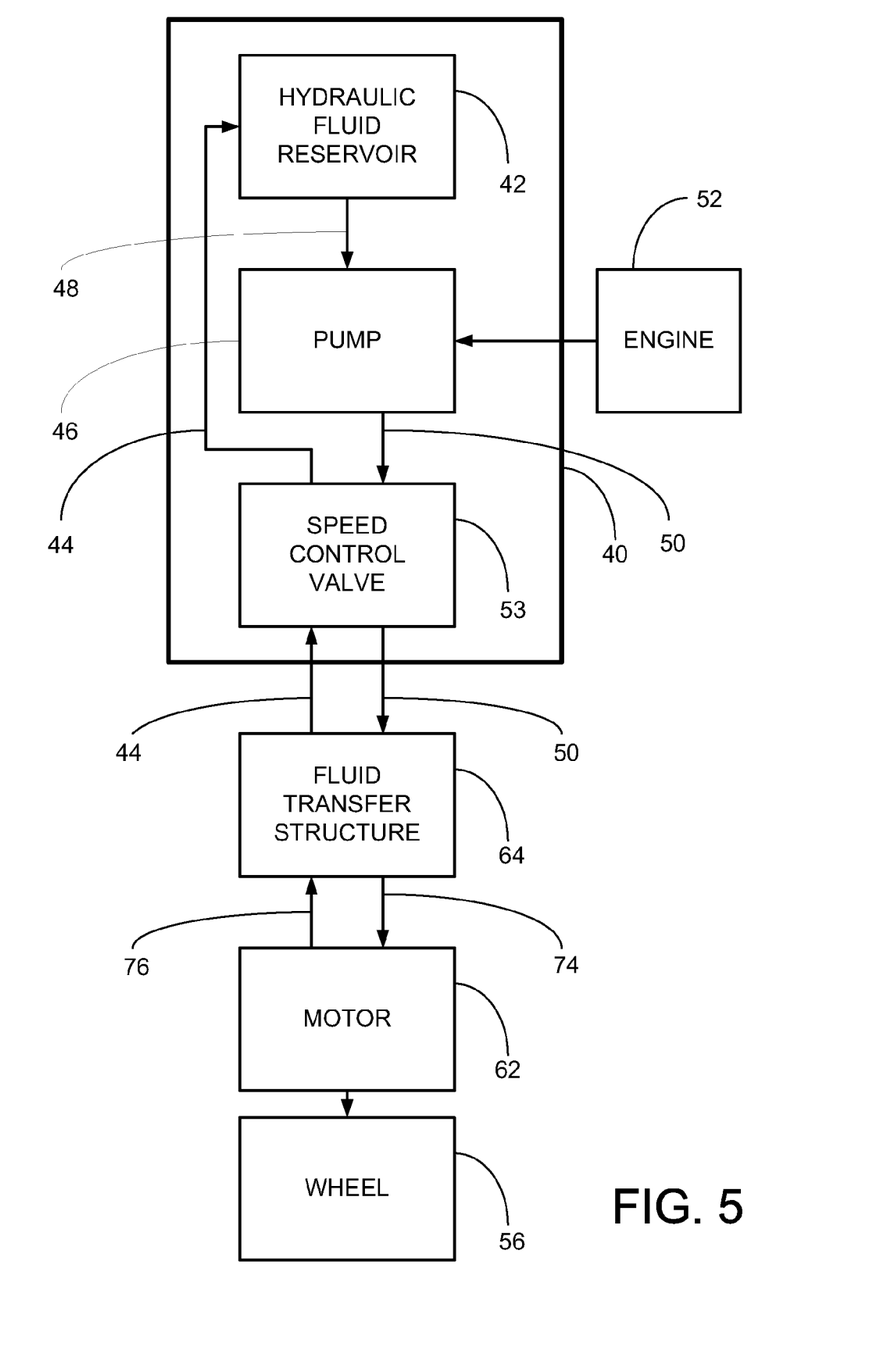
FIG. 5 is a schematic diagram of a system implementing the drivable caster wheel according to an illustrative embodiment.

The system 10 may also include a power apparatus 40 for providing hydraulic power to the drivable caster wheel assembly 10, and the power apparatus may be located on and mounted on the mobile base 14. The power apparatus 40 may include a fluid reservoir 42 that may be a tank that is configured to hold a quantity of hydraulic fluid, and a drain conduit 44 may be in fluid communication with the interior of the fluid reservoir for returning fluid to the reservoir interior after being used by the apparatus. The power apparatus 40 may also include a pump 46 that is in communication with the reservoir and is configured to pump fluid from the reservoir under pressure for use to drive the caster wheel. A first supply conduit 48 may be in fluid communication with the fluid reservoir 42 to receive fluid from the interior of the reservoir, and may connect the reservoir to the pump 46. A second supply conduit 50 may receive the pressurized fluid from an outlet of the pump. The power apparatus 40 may also comprise a motor or engine 54 that is connected to the pump 46 and is configured to operate the pump 46 to pressurize the fluid. In some of the most preferred embodiments, such as the illustrative lawn tractor, the engine 54 is a small gas powered engine. A speed control valve 53 may be included in the hydraulic fluid circuit to control the amount and rate of fluid flow delivered from the pump 46 to the caster wheel assembly 10 to control the speed of rotation of the wheel caused by the hydraulic fluid, as well as the amount of power to be exerted to rotate the wheel (if any). The speed control valve 53 may be interposed in the second supply conduit 50 and drain conduit 44. The speed control valve 53 The speed control valve 53 may be controlled in coordination with the speed at which any other driven wheels of the mobile base are being rotated, and such control may be manually controlled by the operator or may be automatically controlled. For example, the speed of the caster wheel may be coordinated to be equal to, or a fraction of, the speed of any other driven wheels of the mobile base that are not caster wheels.

Figure 2:
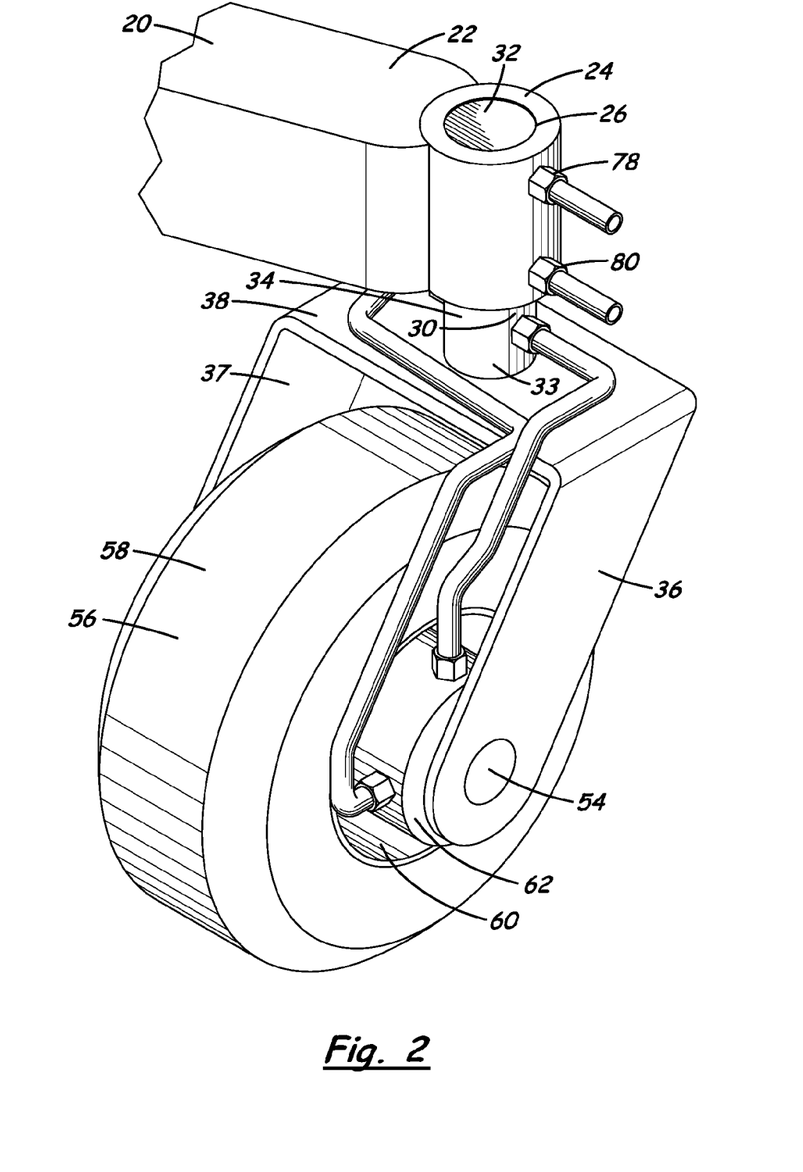
FIG. 2 is a schematic perspective view of the drivable caster wheel, according to an illustrative embodiment.
Figure 3:
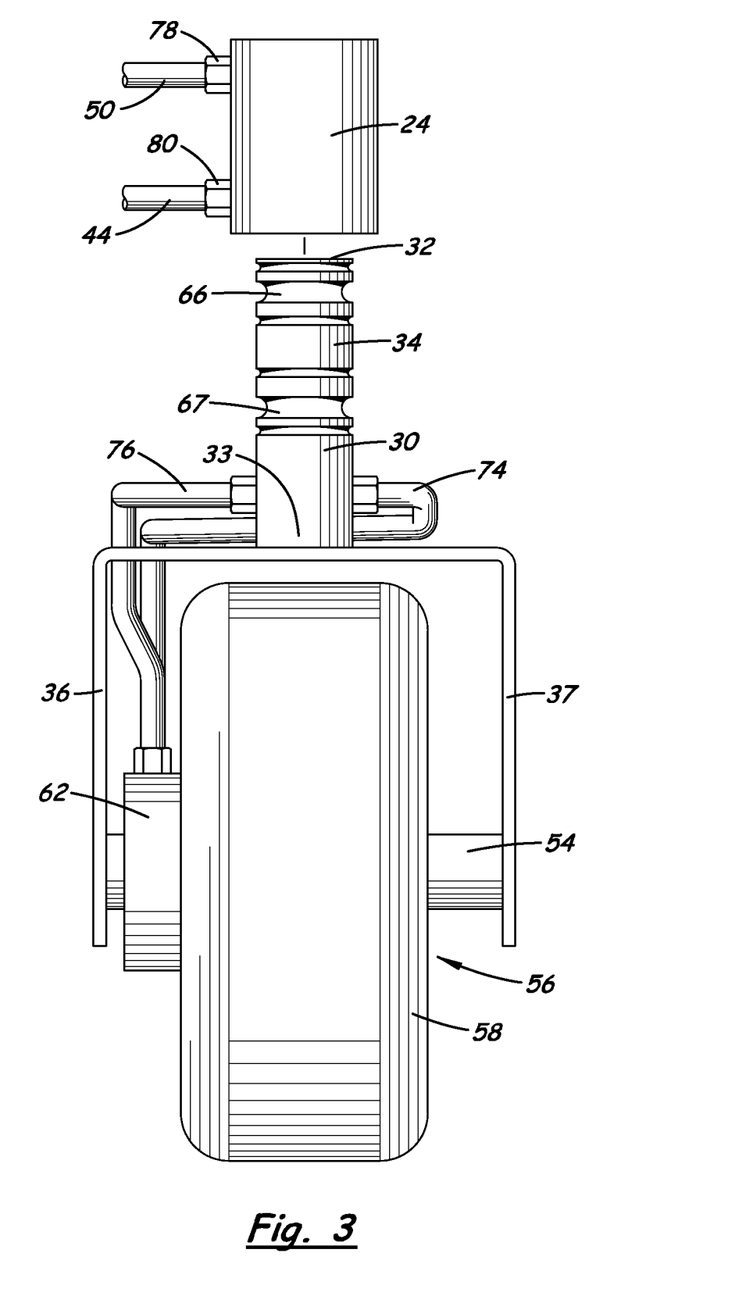
FIG. 3 is a schematic side view of the drivable caster wheel, according to an illustrative embodiment.

The drivable caster wheel assembly 10 may be mounted on the mobile base 14, and the assembly 10 may include a support frame 28 which may be mounted on the base 14, and in particular the frame extension 18 of the base 14. The support frame 28 may be rotatably mounted on the mobile base, and the rotatability may be about a substantially vertical axis, although this is not critical.

Figure 4:
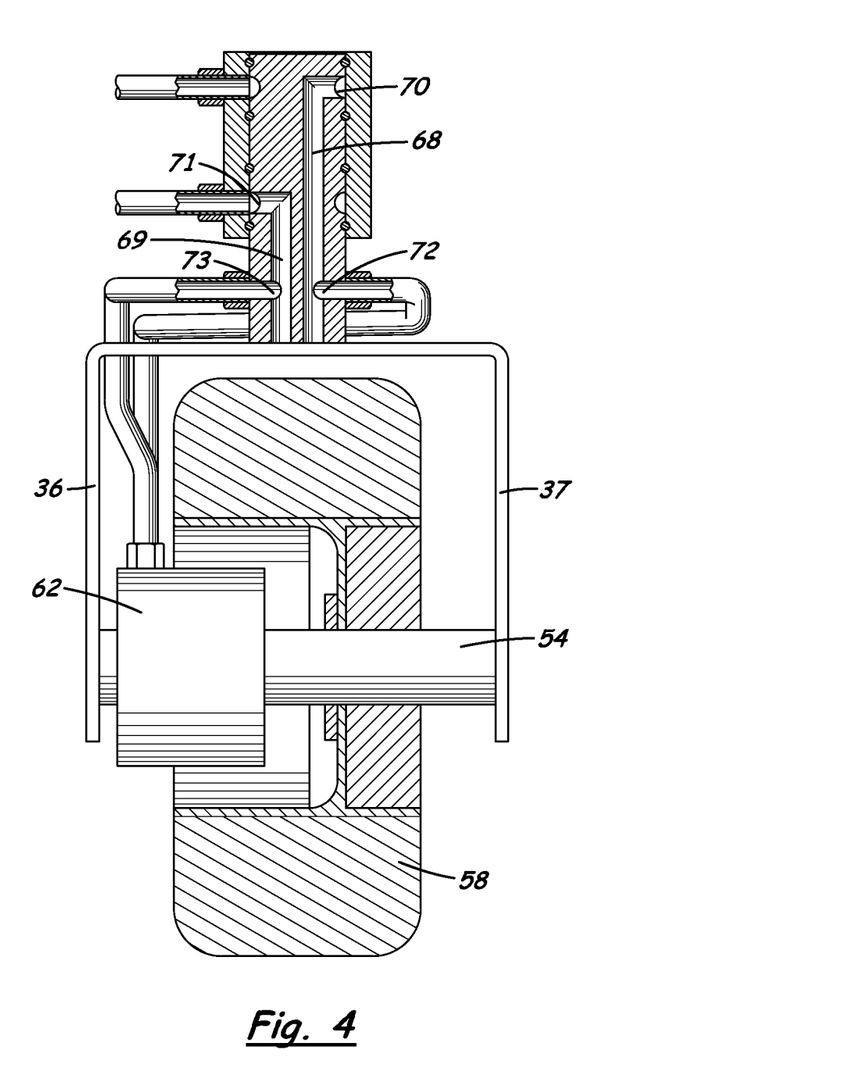
FIG. 4 is a schematic side sectional view of the drivable caster wheel, according to an illustrative embodiment.

In greater detail, the support frame 28 may comprise a post 30 mounted on the main frame with a portion of the post being positioned in the support socket 24, and more specifically the journal 26 of the socket. The post 30 may have an upper end 32 and a lower end 33, and an outer surface 34 that generally extends between the upper and lower ends. The outer surface 34 may be substantially cylindrical in shape to permit rotation of the post in the journal 26. The support frame may also include at least one arm 36 which is mounted on the post 30 and extends downwardly from the post. In the illustrative embodiment, a pair of arms 36, 37 are utilized which may extend downwardly in a substantially parallel relationship and which are spaced from each other in a horizontal direction. The support frame may further comprise a connector element 38 which extends between the pair of arms 36, 37 to link the arms. The connector element 38 is mounted on the post 30, and thus mounts the arms on the post.

The caster wheel assembly 10 may also include an axle 54 that is rotatably mounted on the support frame 28, and may be rotatably mounted on the arms 36, 37 of the support frame such that the axle spans between the arms of the support frame. The axle may be rotatably mounted on each of the arms. A wheel 56 is mounted on the support frame to be rotatable with the support frame about a substantially vertical axis, and this may be accomplished by the wheel being mounted on the axle 54 which in turn is mounted on the support frame. The wheel 56 may be rotatable with the axle, or with respect to the axle. The wheel 56 may be at least partially positioned between the arms 36, 37 of the support frame 28, and may be rotatable about a substantially horizontal axis with respect to the support frame. The wheel 56 may have a perimeter portion 58 and a hub portion 60, with the perimeter portion being positioned about the hub portion. The perimeter portion may comprise a tire formed of natural or synthetic rubber, although other materials may be suitable for this purpose, and the hub portion may comprise a rim on which the tire is mounted. The tire may or may not be filled with pressurized air.

The caster wheel assembly 10 may include a motor 62 that is mounted on the support frame 28 and is configured to cause rotation of the wheel 56 with respect to the support frame about the substantially horizontal axis. The motor 62 may act on the axle 54 to rotate the axle with respect to the support frame as well as rotating the wheel with respect to the support frame. In other implementations, the motor may act on the wheel to rotate the wheel with respect to the axle as well as the support frame. The motor 62 is powered by fluid, and most preferably hydraulic fluid. The motor 62 may be positioned adjacent to the hub portion 60 of the wheel and may also be located inside of the perimeter portion 58. Hydraulic motors of suitable sizes and shapes are known to those skilled in the art for use in this type of application and will not be described further.

The caster wheel assembly 10 may also include a fluid transfer structure 64 that is configured to transfer pressurized hydraulic fluid to the motor 62 for driving the wheel 56 while maintaining the ability of the support frame 28 and wheel 56 to freely rotate with respect to the main frame 16 of the mobile base about a substantially vertical axis. The freedom of movement of the caster wheel assembly 10 about the vertical axis is substantially unlimited. The fluid transfer structure 64 may transfer fluid from the support socket 24 of the main frame 16 to the post 30 of the support frame. The fluid transfer structure 64 may comprise a first annular groove 66 formed on the post 30, and may be formed in the outer surface 34 of the post. A second annular groove 67 may also be formed on the outer surface of the post. The second annular groove 67 is isolated from the first annular groove 66 by sealing structures such as, for example, gaskets, and more particularly, O-ring gaskets, although other means for sealing may also be used. The second annular groove 67 may be located lower on the post than the first annular groove 66, although this relationship is not critical.

The fluid transfer structure 64 may also include a first passage 68 that is formed in the post 30 and that is in communication with the first annular groove 66. The first passage 68 may have a first inlet 70 that is located at and is in communication with the first annular groove 66. The first passage 68 may also have a first outlet 72 that is also located on the outer surface of the post, but while the first inlet is located on a portion of the outer surface that is positioned in the journal of the support socket, the outlet 72 is located outside of the journal. The fluid transfer structure 64 may also include a second passage 69 that is also formed in the post 30 and is in communication with the second annular groove 67. The second passage 69 may have a second inlet 71 that is located at and is in communication with the second annular groove 67. The second passage 69 also has a second outlet 73 that is located on the outer surface 34 of the post, but is also outside of the journal 26 of the support socket 24. The second passage 69 is isolated from the first passage 68 such that fluid does not flow from one passage to the other.

The fluid transfer structure 64 may also include a first transfer conduit 74 that is configured to communicate with the first passage 68 and the motor 62, such as an inlet of the motor, to receive pressurized fluid from the pump 46. The first transfer conduit 74 may be fluidly connected to the first outlet 72 of the first passage. The structure 64 may also include a second transfer conduit 76 that is configured to communicate with the second passage 69 and the motor, such as an outlet of the motor, to receive fluid that has passed through the motor and is to be returned to the fluid reservoir or other low pressure sink. The second transfer conduit 76 may be fluidly connected to the second outlet 73 of the second passage.

The fluid transfer structure 64 may also include a first supply fitting 78 mounted on the support socket 24 and that extends through the wall of the support socket to the journal 26 of the support socket. The first supply fitting 78 may be being positioned on the support socket in a location that aligns with the first annular groove 66 in the post 30 such that fluid moving through the first supply fitting 78 moves into the first annular groove independent of the rotational orientation of the post with respect to the support socket, and thus the flow of pressurized hydraulic fluid from the pump to the motor continues regardless of the rotation of the post with respect to the socket. The fluid transfer structure 64 may also include a second supply fitting 80 that is also mounted on the support socket and that extends through the wall of the support socket to the journal 26 of the support socket. The second supply fitting 80 may be positioned on the support socket in a location that aligns with the second annular groove 67 in the post 30 such that fluid moving through the second passage 69 to the second annular groove 67 is able to move into the second supply fitting 80 independent of rotational orientation of the post 30 with respect to the support socket 24, and thus the flow of the hydraulic fluid from the motor to the fluid reservoir continues regardless of the rotation of the post with respect to the socket.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A drivable caster wheel assembly comprising:
    a support socket for mounting on a mobile base, the socket defining a journal;
    a support frame mounted on the support socket and comprising:
        a post with at least a portion thereof positioned in the journal and being rotatable in the journal of the support socket about a substantially vertical axis, the post having an outer surface;
        at least one arm mounted on the post and extending downwardly from the post;
    an axle mounted on the at least one arm of the support frame;
    a wheel mounted on the axle and being rotatable with respect to the support frame about a substantially horizontal axis;
    a hydraulic motor mounted on the support frame and configured to rotate the wheel with respect to the support frame;
    a fluid transfer structure configured to transfer fluid from a fluid power source on the mobile base when the support socket is mounted on the mobile base to the motor for driving the wheel while maintaining an ability of the support frame and wheel to rotate with respect to the support socket about the substantially vertical axis;
    wherein the support frame and wheel are rotatable through at least one complete rotation with respect to the support socket.

2. The caster wheel assembly of claim 1 wherein the support frame and wheel are rotatable with respect to the support socket about a substantially vertical axis.

3. The caster wheel assembly of claim 1 wherein the fluid transfer structure comprises:
    a first annular groove formed on the post;
    a second annular groove formed on the post and isolated from the first annular groove;
    a first supply fitting mounted on the support socket and extending through the support socket to the journal of the support socket, the first supply fitting being positioned on the support socket in alignment with the first annular groove in the post such that fluid is able to move between the first supply fitting and the first annular groove independent of rotational orientation of the post with respect to the support socket; and
    a second supply fitting mounted on the support socket and extending through the support socket to the journal of the support socket, the second supply fitting being positioned on the support socket in alignment with the second annular groove in the post such that fluid is able to move between the second supply fitting and the second annular groove independent of rotational orientation of the post with respect to the support socket.

4. A drivable caster wheel assembly comprising:
a support socket for mounting on a mobile base, the socket defining a journal;
a support frame mounted on the support socket and comprising:
   a post with at least a portion thereof positioned in the journal and being rotatable in the journal of the support socket about a substantially vertical axis, the post having an outer surface;
   at least one arm mounted on the post and extending downwardly from the post;
an axle mounted on the at least one arm of the support frame;
a wheel mounted on the axle and being rotatable with respect to the support frame about a substantially horizontal axis;
a hydraulic motor mounted on the support frame and configured to rotate the wheel with respect to the support frame;
a fluid transfer structure configured to transfer fluid from a fluid power source on the mobile base when the support socket is mounted on the mobile base to the motor for driving the wheel while maintaining an ability of the support frame and wheel to rotate with respect to the support socket about the substantially vertical axis;
wherein the fluid transfer structure comprises:
   a first annular groove formed on the post;
   a second annular groove formed on the post and isolated from the first annular groove;
   a first supply fitting mounted on the support socket and extending through the support socket to the journal of the support socket, the first supply fitting being positioned on the support socket in alignment with the first annular groove in the post such that fluid is able to move between the first supply fitting and the first annular groove independent of rotational orientation of the post with respect to the support socket; and
   a second supply fitting mounted on the support socket and extending through the support socket to the journal of the support socket, the second supply fitting being positioned on the support socket in alignment with the second annular groove in the post such that fluid is able to move between the second supply fitting and the second annular groove independent of rotational orientation of the post with respect to the support socket.

5. The caster wheel assembly of claim 4 wherein the fluid transfer structure further comprises:
a first passage formed in the post and having a first inlet in communication with the first annular groove and a first outlet on the outer surface of the post located outside of the journal of the support socket; and
a second passage formed in the post and having a second inlet in communication with the second annular groove and a second outlet on the outer surface of the post located outside of the journal of the support socket, the second passage being isolated from the first passage.

6. The caster wheel assembly of claim 5 wherein the fluid transfer structure further comprises:
a first transfer conduit configured to fluidly communicate with the first passage and the motor; and
a second transfer conduit configured to fluidly communicate with the second passage and the motor.

7. The caster wheel assembly of claim 4 wherein the first annular groove and the second annular groove are formed in the outer surface of the post.

8. A system comprising:
a mobile base including a main frame and at least one wheel mounted on the main frame;
a fluid power source on the mobile base;
a drivable caster wheel assembly comprising:
   a support socket mounted on the main frame of the mobile base, the socket defining a journal;
   a support frame mounted on the support socket and comprising a post having an outer surface with at least a portion thereof positioned in the journal and being rotatable in the journal about a substantially vertical axis, and at least one arm mounted on the post and extending downwardly from the post;
   an axle mounted on the at least one arm of the support frame;
   a wheel mounted on the axle and being rotatable with respect to the support frame about a substantially horizontal axis;
   a hydraulic motor mounted on the support frame and configured to rotate the wheel with respect to the support frame; and
   a fluid transfer structure configured to transfer fluid from the fluid power source on the mobile base when the support socket is mounted on the mobile base to the motor for driving the wheel while maintaining an ability of the support frame and wheel to rotate with respect to the support socket about the substantially vertical axis;
wherein the support frame and wheel are rotatable through at least one complete rotation with respect to the support socket.

9. The system of claim 8 wherein the support frame and wheel are rotatable with respect to the support socket about a substantially vertical axis.

10. The system of claim 8 wherein the fluid transfer structure comprises:
a first annular groove formed on the post;
a second annular groove formed on the post and isolated from the first annular groove;
a first supply fitting mounted on the support socket and extending through the support socket to the journal of the support socket, the first supply fitting being positioned on the support socket in alignment with the first annular groove in the post such that fluid is able to move between the first supply fitting and the first annular groove independent of rotational orientation of the post with respect to the support socket; and
a second supply fitting mounted on the support socket and extending through the support socket to the journal of the support socket, the second supply fitting being positioned on the support socket in alignment with the second annular groove in the post such that fluid is able to move between the second supply fitting and the second annular groove independent of rotational orientation of the post with respect to the support socket.

11. The system of claim 10 wherein the fluid transfer structure further comprises:
a first passage formed in the post and having a first inlet in communication with the first annular groove and a first outlet on the outer surface of the post located outside of the journal of the support socket; and
a second passage formed in the post and having a second inlet in communication with the second annular groove and a second outlet on the outer surface of the post located outside of the journal of the support socket, the second passage being isolated from the first passage.

12. The system of claim 11 wherein the fluid transfer structure further comprises:

a first transfer conduit configured to fluidly communicate with the first passage and the motor; and a second transfer conduit configured to fluidly communicate with the second passage and the motor.

13. The system of claim 11 wherein the first annular groove and the second annular groove are formed in the outer surface of the post.

14. A system comprising:

a mobile base including a main frame and at least one wheel mounted on the main frame;

a fluid power source on the mobile base;

a drivable caster wheel assembly comprising:

a support socket mounted on the main frame of the mobile base, the socket defining a journal;

a support frame mounted on the support socket and comprising a post having an outer surface with at least a portion thereof positioned in the journal and being rotatable in the journal about a substantially vertical axis, and at least one arm mounted on the post and extending downwardly from the post;

an axle mounted on the at least one arm of the support frame;

a wheel mounted on the axle and being rotatable with respect to the support frame about a substantially horizontal axis;

a hydraulic motor mounted on the support frame and configured to rotate the wheel with respect to the support frame; and a fluid transfer structure configured to transfer fluid from the fluid power source on the mobile base when the support socket is mounted on the mobile base to the motor for driving the wheel while maintaining an ability of the support frame and wheel to rotate with respect to the support socket about the substantially vertical axis;

wherein the fluid power source comprises a fluid reservoir on the mobile base and configured to hold a quantity of fluid;

a pump on the mobile base and in communication with the reservoir and configured to pump fluid from the reservoir under pressure to the fluid transfer structure; and an engine on the mobile base and connected to the pump and configured to operate the pump to pressurize the fluid.

\* \* \* \* \*